United States Patent [19]

Elam

[11] 3,898,983

[45] Aug. 12, 1975

[54] DEVICE AND METHOD FOR DETECTING THE DEGREE OF MUSCLE RELAXATION OF A MEDICAL PATIENT

[76] Inventor: James O. Elam, 6723 S. Euclid Ave., Chicago, Ill. 60649

[22] Filed: Oct. 3, 1973

[21] Appl. No.: 403,017

[52] U.S. Cl. ............... 128/2 N; 128/2 S; 128/2.1 R; 128/213; 128/214 E; 128/DIG. 13
[51] Int. Cl.² .......................................... A61B 5/05
[58] Field of Search .......... 128/2 S, 2 N, 2 R, 2.1 R, 128/2.1 B, 213, DIG. 13

[56] References Cited
UNITED STATES PATENTS

| | | | |
|---|---|---|---|
| 2,678,692 | 5/1954 | Ranseen | 128/2 N |
| 2,690,178 | 9/1954 | Bickford | 128/2.1 B |
| 3,364,929 | 1/1968 | Ide et al. | 128/2.1 R |
| 3,513,834 | 5/1970 | Suzuki et al. | 128/2.1 B |
| 3,651,806 | 3/1972 | Hirshberg | 128/214 E |
| 3,690,308 | 9/1972 | Daniels | 128/2 N |

OTHER PUBLICATIONS

Brunner, E. A. et al., Anesthesiology, November, 1969, Vol. 31, pp. 466–467.
Nemazie, A. S. et al., Anesthesiology, Vol. 28, No. 1, pp. 215–217.

*Primary Examiner*—Kyle L. Howell
*Attorney, Agent, or Firm*—Curtis, Morris & Safford

[57] ABSTRACT

The system and method automatically indicate the degree to which the muscles of a surgical patient have been relaxed by the use of relaxant drugs, and control the dispensing of relaxant drugs to the patient. Electrical pulses are applied to the ulnar nerve between two points on an arm of the patient. This causes the fingers on that arm to clench. The clenching or flexing of the fingers is detected by an inflatable bladder which is placed in the patient's hand. The patient's fingers are held tightly against the surface of the bladder by an evacuatable enclosure so that when the fingers flex they squeeze the bladder. The resulting change in pressure of the gas in the bladder is detected either by a pressure meter or by a piezoelectric crystal which converts the pressure changes into electrical signals. The magnitude of the signals indicates the degree of muscle relaxation of the patient. The electrical signals are read on an electrical meter, or are recorded or are utilized to control a system for dispensing the relaxant drug to the patient. In the preferred embodiment of the invention, a burst of electrical pulses called tetanic stimulation is applied to the ulnar nerve. This creates a tetanic state in which the muscles flex the fingers continuously for about five seconds. A selected number of the resulting post-tetanic pulses from the bladder-detector are sampled and integrated with respect to time. If the integration value is above a pre-set value, then this indicates the need for further relaxant drugs, and a pre-determined dose of such a drug is automatically dispensed by a parenteral fluid dispensing system. If the integration value is below the pre-set level, this indicates satisfactory muscle relaxation, and no additional drugs are dispensed.

13 Claims, 4 Drawing Figures

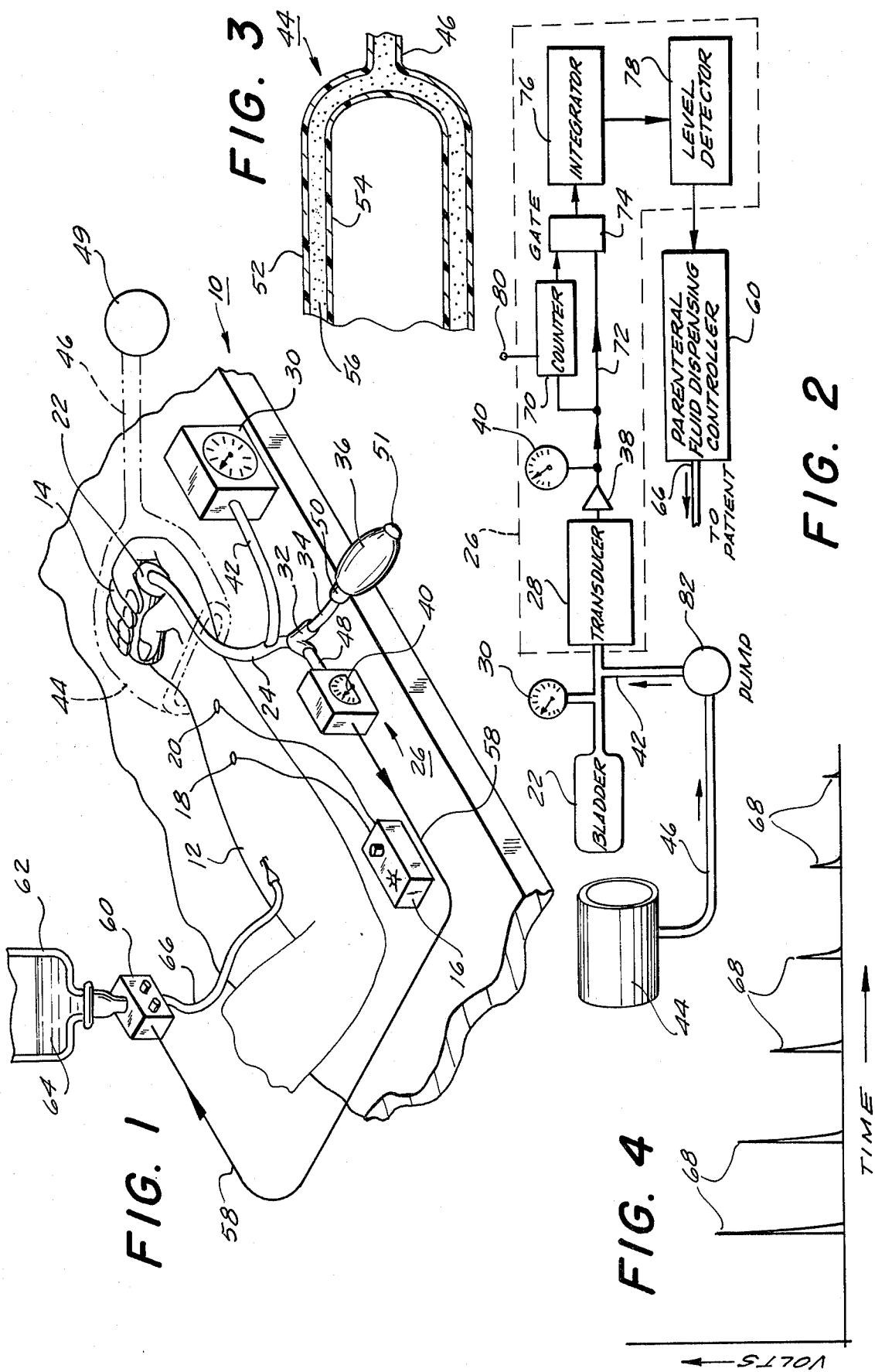

DEVICE AND METHOD FOR DETECTING THE DEGREE OF MUSCLE RELAXATION OF A MEDICAL PATIENT

The present invention relates to devices and methods of determining the degree of muscle relaxation in a living being; more specifically, the invention relates to apparatus and methods for measuring and indicating the effect of the use of relaxant drugs to relax and prevent contractions of the muscles of patients during surgery, and for dispensing relaxant drugs to the patients.

In many surgical operations, it is important to prevent the muscles of a patient from flexing during the surgical process. A common procedure is to relax the muscles by administering relaxant drugs such as curare, pancuronium, gallamine, triethiodide, succinylcholine, d-tubocurarine chloride, mylaxen, and decamethonium. If a proper dose of the relaxant drug is given, after the surgery the effects of the drug will wear off, the patient will regain his ability to breathe naturally, and he will suffer no ill after-effects. However, if an overdose is given, highly undesirable extended paralysis and other after-effects may occur. Therefore, it is important to measure the degree of relaxation of the patient, both to determine whether enough of the relaxant drug has been used, and to prevent overdoses.

One current method of measuring the degree of relaxation of the patient is to apply an electrical voltage pulse to a nerve group such as the ulnar nerve in the arm or the facial nerve of the face, and observe the flexing of the muscles in response to the pulses. In the case in which the electrical signals are applied to the ulnar nerve in the arm, the result is that the fingers clench. The degree of movement of the fingers has been found to be an inverse measure of the muscle relaxation. Thus, a great deal of movement indicates the need for more drugs, and little movement indicates the sufficiency of the dosage.

In the above-described current method, the flexing of the fingers or facial muscles of the patient has been observed visually by medical personnel in order to determine the sufficiency of the dosage. However, this method has distinct disadvantages in that it is not as accurate as might be desired, and in that there is no documentation of the patient's response to the drugs. Furthermore, the current method produces no pneumatic or electrical signal to drive other related equipment, such as equipment for controlling the rate of dispensing relaxant drugs intravenously.

Accordingly, it is an object of the present invention to provide a device and method for measuring the degree of relaxation of the muscles of a living being, and particularly to provide such a device and method having improved accuracy. A further object of the present invention is to provide such a device and method which gives a pneumatic or electrical signal which is a function of the degree of relaxation. Another object is to provide a system for automatically dispensing the relaxant drug to the patient.

In accordance with the present invention, the foregoing objects are met by the provision of a device and method in which electrical stimulating signals are applied to selected nerves or nerve groups in order to cause selected muscles of the living being to flex. A transducer is provided for converting the movement of the selected muscle or muscles into a pneumatic or electrical signal which is a function of the amount of the movement. Specifically, in a preferred embodiment of the invention, the transducer means is pressure-sensitive, and means are provided for converting the movement of the muscles into changes in the pressure in a fluid. Preferably, a flexible pressurized bladder such as a rubber bulb is placed in the hand of the patient, and stimulation signals are applied to the ulnar nerve for that hand. When the fingers of the hand flex, they compress the gas in the bladder. Means are provided for converting the pressure changes in the bladder into pneumatic or electrical signals, either for measurement and indication, or for the operation of recorders or drug dispensing controllers. In one embodiment of the invention, post-tetanic signals are integrated and compared with a pre-set standard to determine the degree of relaxation. Another feature of the invention is the use of an evacuatable sand bag to fit over the patient's hand to hold it against the bladder and prevent extraneous pressures from artificially operating the device.

Further aspects and advantages of the invention will be set forth in or apparent from the following description and drawings.

In the drawings:

FIG. 1 is a perspective view of the system of the present invention;

FIG. 2 is a schematic diagram of the system of FIG. 1, with modifications;

FIG. 3 is a cross-sectional view of a component of the system of FIG. 1; and

FIG. 4 is a waveform diagram of electrical signals used in the system of FIGS. 1 and 2.

GENERAL DESCRIPTION

Referring first to FIG. 1, the relaxation indication system 10 is used with the arm 12 of a surgical patient. The patient's hand is indicated at 14. A conventional source 16 of electrical stimulation pulses is applied to the ulnar nerve in the arm 12 of the patient by means of electrodes or needles 18 and 20 inserted into the arm of the patient. The pulses produced by the source 16 cause the fingers of the hand 14 to contract suddenly in a direction tending to form the hand into a fist.

In accordance with the present invention, the degree of relaxation of the patient is measured by means of an inflatable member or bladder 22 which is placed in the hand 14 of the patient. Thus, when the muscles of the patient contract in response to the pulses supplied by the generator 16, the fingers of the hand 14 will compress the bladder 22 and increase the pressure of the gas in the bladder.

The gas in the bladder 22 communicates through a tube 24, a Y joint 32 and a tube 48 to an electrical control unit 26. Referring to FIG. 2 as well as FIG. 1, the control unit 26 includes a transducer 28 which converts the pressure changes in the gas into electrical signals. The transducer 28 is a piezoelectric cyrstal or other known device for converting gas pressure into electrical signals.

The signals from the transducer 28 are amplified by an amplifier 38 and then are delivered to an electrical meter 40 which indicates the magnitude of the amplified signal. Thus, the meter 40 gives an indication of the degree of relaxation of the patient whenever pulses are applied to the ulnar nerve.

As an alternative, the pressure gage 30 is connected through a tube 42 to the tube 24. Thus, the gage 30 also is capable of indicating the degree of relaxation of the patient's muscles.

A flexible rubber bulb 36 is connected through tube 34 and the Y connector 32 to the conduit from the bladder 22 to the transducer 28. The bulb is of the type used to pump sphygmometer cuffs, and is squeezed in order to inflate the bladder 22 to give it a desired pressure. The bulb 36 has valves 50 and 51 which allow air to enter the bulb but not escape during pumping. The valve 51 can be opened to allow the air in the bladder 22 to escape to deflate the bladder.

In order to ensure that substantially all of the motion of the fingers is imparted to the bladder 22, it is desirable to hold the fingers of the hand 14 tightly against the surface of the bladder. Furthermore, it is desired to isolate the hand and bladder from outside pressures, such as those caused by contact from the surgeon or other operating room personnel. For this purpose there is provided an evacuation enclosure or "mitten" 44 into which the patient's hand is inserted with fingers wrapped around the bladder 22. As it is shown in FIG. 3, the mitten 44 includes an air-tight flexible bag formed of two flexible plastic walls 52 and 54. The bag is filled with fine, dry sand 56. The bag has an outlet tube (also see FIG. 1) connected to a vacuum pump 49. When the mitten is in place on the patient's hand, the vacuum pump 49 is operated to remove air from the sand 56. This causes the sand and bag material to be molded into the contours of the clenched fist so as to hold the first still and provide protection from blows or pressure on the exterior. The mitten thus acts like a plaster cast around the fist and the bladder.

Once the fingers of the hand have been fastened in position, the pump 36 is used to inflate the bladder 22 until the reading of the meter 40 or 30 is at its zero setting. Thereafter, when the pulses are applied by the generator 16, the depression of the bladder by the patient's fingers produces pulses in the transducer 28 due to the changes in pressure, and those pulses are amplified by the amplifier 38, and are displayed on the meter 40. The pressure pulses also cause the needle of the pressure gage 30 to be deflected.

The system can be used to indicate the need for further relaxant drugs, or to indicate that the muscles are sufficiently relaxed. Another way of using the system is to measure the voltages produced by the patient to which no relaxant drug has yet been administered. The indication of the meter 30 or 40 then is used as a reference figure. Subsequently, during the administration of the relaxant drug, the reading of the meter can be compared with the initial reading to indicate the approximate percent of paralysis or relaxation of the patient from his initial condition.

The stimulation pulse generator 16 is conventional, as are the electrodes or needles 18 and 20. A suitable generator 16 is the "Peripheral Nerve Stimulator" sold by Burroughs-Wellcome Corporation.

A typical stimulator which has been found to operate successfully has an operating frequency of approximately one cycle every 5 or 10 seconds; that is, a stimulation pulse is produced once every 5 or 10 seconds. The output voltage is variable, but a typical value is approximately 250 volts. A typical duration of each pulse is approximately 1.3 milliseconds.

The electrical signals corresponding to the finger clenching movements can be used to drive pen recorders, recording oscilloscopes, or other visual recording equipment, so as to provide a permanent record of the signals.

AUTOMATIC DRUG DISPENSING

The system of this invention also can be used to regulate the automatic dispensing of relaxant drugs to the patient. For this purpose, the output of the control unit 26 (see FIG. 1) is conducted over a line 58 to a parenteral fluid dispensing control device 60. The device 60 is a conventional device which can deliver a liquid relaxant drug 64 from a bottle 62 through a tube 66 into the veins of the patient's arm 12. Preferably, the device 60 delivers a pre-determined quantity of drugs to the patient in response to the receipt of an electrical signal. The preferred method of developing such a signal will be described next.

POST-TETANIC RESPONSE

It is preferred to detect the post-tetanic response of the patient and use this response to develop the control signal for the parenteral fluid controller 60. The preferred post-tetanic response is the sustained flexing of the fingers during the application of a relatively high-frequency (e.g., 50 Hz) burst of pulses to the ulnar nerve by means of the electrodes 18 and 20. Such bursts are produced by the actuation of a control on the pulse generator 16, and thus are under the control of medical personnel. Of course, the timing of the application of the bursts can be programmed and controlled by a computer, if desired.

FIG. 4 shows a typical waveform diagram of post-tetanic pulses 68 produced by a patient connected to the system of FIG. 1. It is believed that the post-tetanic pulses are a more reliable indication of the degree of relaxation of the patient than are the pulses produced without tetanus. Therefore it is desired to use the post-tetanic pulses in the automatic dispensing of relaxant drugs.

It is most desirable to sample the first few post-tetanic pulses because they are the strongest and easiest to detect. In order to determine the degree of relaxation, according to this further feature of the invention, the first few pulses are integrated with respect to time, and the integration product, in the form of an electrical signal, is compared with a pre-set level. If the signal is below that level, the dispensing system remains inactive and delivers no drugs to the patient. If the signal exceeds the pre-set level, the controller 60 is activated and it delivers a pre-determined dose of drug(s) to the patient.

Referring again to FIG. 2, the foregoing is accomplished by means of a counter 70, a gate 74, an integrator 76, and a level detector 78. The counter 70 is connected to receive the pulses from the amplifier 38, and the output of the counter is delivered to one input of the gate 74. The pulses from amplifier 38 are conducted over a lead 72 to the other input of the gate 74. The counter 70 is of the count-down variety. Also, it produces no output signal when its count is zero, but produces an output signal when its count is other than zero. The counter 70 has a reset lead 80 which is connected to a filter network (not shown) and to the pulse generator 16 so as to be reset to a pre-determined count only in response to and at the end of the tetanic pulse burst produced by the generator. The filter is tuned to the frequency of the tetanic pulses. The counter then steps down by one count for each detection of a post-tetanic pulse. Since the input to the gate 74 from the counter is high until the counter counts down to zero, the pulses from the amplifier 38 will be transmitted through line 72 and gate 74 to the integrator 76. When the counter counts down, the gate 74 is closed and further pulses cannot reach the integrator. A timer (not shown) is provided to finish the countdown of the counter if the desired number of pulses has not been produced after a certain time.

The integrator 76 produces an output proportional to the time integral of the selected post-tetanic pulses. The level detector 78 produces an output signal only if the signal it receives from the integrator exceeds a pre-set level. Then, and only then, is a signal sent to the drug dispensing controller 60, which then delivers a measured dose of drugs to the patient.

The number of post-tetanic pulses selected can be varied as needed. However, it is believed that four pulses will give a representative sampling.

FIG. 2 also shows an alternative arrangement for pressurizing the bladder 22 and evacuating the mitten 44. This is accomplished by means of a single electrically driven pump 82 of an inexpensive type such as a pump used to aereate the water in an aquarium. The pump has a positive pressure outlet, to which the line 42 is connected, and a negative pressure inlet to which the line 46 is connected. Thus, a single pump is used to pressurize the bladder and evacuate the mitten.

The above description of the invention is intended to be illustrative and not limiting. Various changes or modifications in the embodiments described may occur to those skilled in the art and these can be made without departing from the spirit of scope of the invention.

I claim:

1. A relaxation detector device comprising a stimulator means for electrically stimulating selected muscles of a living being and causing said muscles to flex, transducer means adapted to be associated with at least one of said selected muscles for converting the movement of said muscle into a signal which is a function of the amount of said movement, and holding means for holding against non-flexing movement a part of the body which is moved when said muscles flex, said holding means comprising a flexible, thin-wall gas-tight container shaped to enclose said body part and having a granular material therein, and means for removing gas from said container.

2. A device as in claim 1 in which said transducer means is pressure-sensitive and includes a fluid in a closed container, and means for converting said movement into changes in the pressure of said fluid.

3. A device as in claim 2 in which said container is a bladder with flexible walls and shaped to be gripped by the human hand, said stimulator is adapted to be connected to stimulate the ulnar nerve in a human arm, and said holding means is shaped to enclose said hand.

4. A device as in claim 2 including pump means for initially pumping the pressure in said fluid up to a predetermined level.

5. A device as in claim 2 in which said transducer means includes a means for converting the pressure in said container into a corresponding electrical signal, amplifier means for amplifying said corresponding signal, and meter means for indicating the magnitude of said signal.

6. A device as in claim 1 in which said transducer means is pressure-sensitive and includes a fluid in a closed container, and means for converting said movement into changes in the pressure of said fluid.

7. A device as in claim 6 including means for selecting a pre-determined number of said signals, integrating the selected signals with respect to time, and producing a signal proportional to the integration product.

8. A device as in claim 7 including a level detector means for detecting and indicating the condition in which said integration product signal reaches and/or passes a predetermined level.

9. A method of detecting the degree of relaxation of a medical patient, said method comprising applying electrical stimulation signals to cause post-tetanic twitch of at least one selected muscle of said patient, converting the post-tetanic twitches into corresponding tetanic signals, and converting the magnitude of a train of said signals into a signal indicating the degree of relaxation of said patient.

10. A method as in claim 9 including the step of integrating a plurality of said post-tetanic signals and comparing the integration product with a standard to determine the degree of relaxation.

11. A relaxation detector device comprising a stimulator means for electrically stimulating selected muscles of a living being and causing post-tetanic flexing of said muscles, transducer means adapted to be associated with at least one of said selected muscles for converting the movements of said muscle into signals the magnitude of each of which is a function of the amount of said movement, and means for converting the magnitude of a train of said signals into a signal indicating the degree of relaxation.

12. A method of detecting the degree of relaxation of a medical patient, said method comprising enclosing a portion of the body of said patient in a flexible-walled container with air-tight walls and granular material between the walls, evacuating air from said granular material to form a hard casing around said body portion, applying electrical stimulation signals to cause at least one selected muscle of said body portion of said patient to flex, and using the resulting flexing of said muscle to indicate said degree of relaxation.

13. A method as in claim 12 in which the selected muscles include those which cause the fingers of the hand of said patient to close, and including the steps of placing an inflated bladder in said hand, and converting the change of pressure in said bladder, upon the closing of said fingers around said bladder, into said indication signal, said enclosing step comprising enclosing said hand.

* * * * *